May 22, 1956     J. J. JAEGER     2,747,151
CONTROL SYSTEM FOR MACHINE TOOLS

Original Filed Sept. 1, 1944     2 Sheets-Sheet 1

INVENTOR
J. J. Jaeger
BY Joseph N. Schofield
ATTORNEY

May 22, 1956  J. J. JAEGER  2,747,151
CONTROL SYSTEM FOR MACHINE TOOLS
Original Filed Sept. 1, 1944  2 Sheets-Sheet 2

INVENTOR
J. J. Jaeger
BY
Joseph H. Schofield
ATTORNEY

United States Patent Office 2,747,151
Patented May 22, 1956

2,747,151

CONTROL SYSTEM FOR MACHINE TOOLS

Jacob J. Jaeger, Canton Center, Conn., assignor, by mesne assignments, to Pratt & Whitney Company, Incorporated, West Hartford, Conn., a corporation of Delaware Continuation of application Serial No. 552,287, September 1, 1944. This application December 1, 1950, Serial No. 198,587

3 Claims. (Cl. 318—162)

This invention relates to improvements in the control of duplicating or profiling machines, such as the Keller automatic profiling machine, in which the control of a tracer and cutter moving completely about a template of any configuration and work piece respectively is effected electrically. The control is effected by circuits having contacts made and broken by the tracer as it engages and disengages the template during its travel around the periphery of the template.

More particularly the invention relates to a fully automatic template reproducing machine that will enable the complete outline of a template of any shape to be reproduced in a work piece of any thickness by continuously traversing the template outline.

The improvement according to the present invention is based upon the fact that there are three controlled motions of the tracer; namely, first, a toward motion; second, a leading motion; and third, an away motion, which are interchangeable with respect to four directions of movement of the tracer; namely, an up or down movement, a movement to the right or to the left.

In the embodiment of the invention selected for illustration the movement of the tracer about the template and the corresponding movement of the cutter about the work piece take place in short steps. It will be understood, however, that these steps will be exceedingly short and invisible in the finished work piece. Also it will be understood that the direction of movement of the tracer and tool about the template and work piece respectively may be continuously varied so that their movements may be without steps.

This application is a continuation of my co-pending application Serial No. 552,287, filed September 1, 1944 (now abandoned).

In a preferred embodiment of the invention the change of the leading movement from, for instance, a movement to the right, to an up movement, is effected by cam controlled relays, the cam being automatically operated at the point where the desired change-over is required.

In order that the invention may be clearly understood, reference is made to the accompanying drawings which illustrate by way of example one way of putting the present invention into practice and in which.

The present invention is shown adapted for application to an automatic electrically controlled duplicating machine of the Keller type such as shown in the patent to Shaw 1,683,581, granted September 4, 1928. The complete wiring diagrams for the machine to operate the clutch magnets for controlling movements of the principal members are shown in the present drawings.

Figure 1:
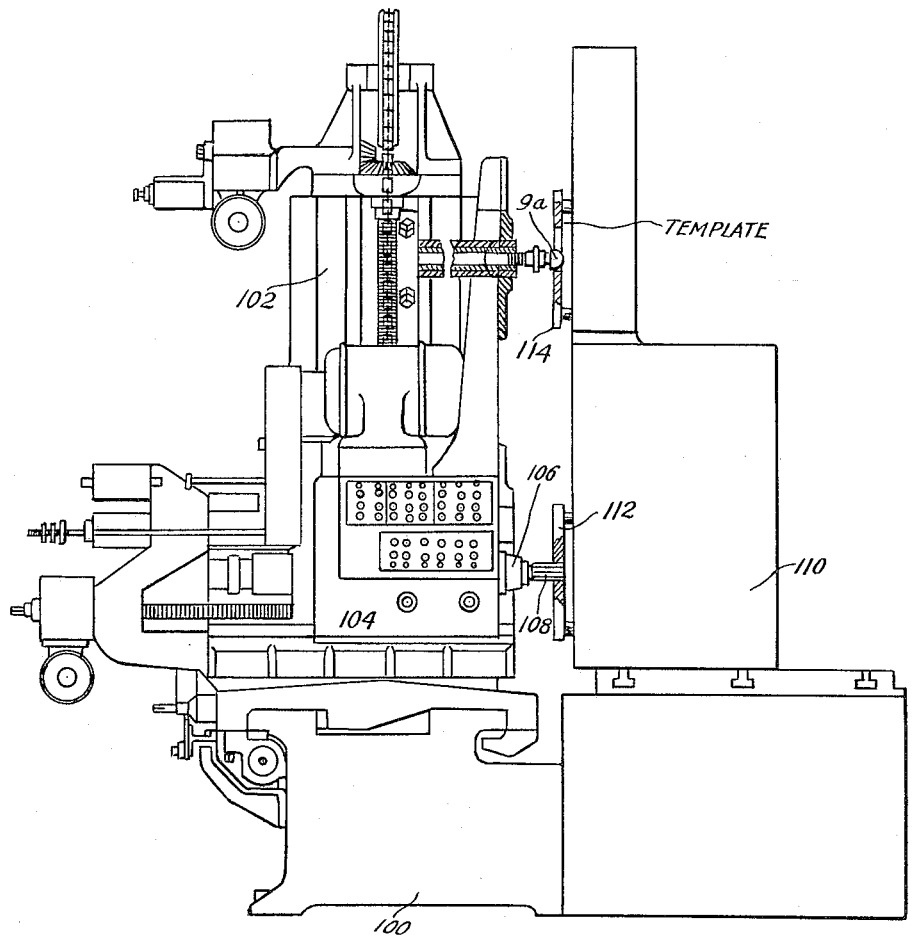
Fig. 1 is a side elevation of a standard form of tracer controlled profiling machine to which the present invention may be applied.

A complete machine of the automatic, electrically-controlled duplicating type is shown in outline in Fig. 1. In this figure a base 100 supports a column 102 movable thereon, on which a cutter carriage 104 moves up and down. In the cutter carriage is a horizontal cutter or spindle 106 having a rotatable cutting tool 108 at one end and movable toward and from a support 110 on the base 100 for a fixed work piece 112. Above the work piece 112 is a template 114 supported in fixed position on the support similarly to the work piece. Engaging the outline to be reproduced in the template is a tracer 9$^a$ movable with the column 102, the cutter carriage 104 and the cutter spindle 106. As the above referred to parts are the principal parts of a standard machine, as shown in the patent to Shaw 1,683,581, it is not thought that further description of them will be necessary.

When contacts in the various circuits are referred to as normally open or normally closed, this condition is intended to be an indication with respect to the unenergized condition of their control coil.

Figure 2:
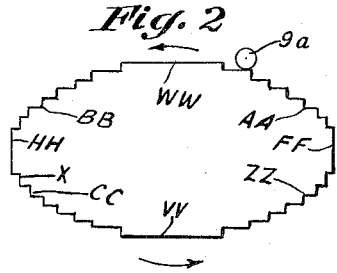
Fig. 2 is a diagram showing movements of a tracer about the outside surface of a template.
Figure 3:
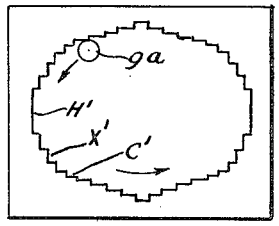
Fig. 3 is a diagram similar to Fig. 2 showing movements of a tracer about an inside surface of a template.

The step by step movements by which the tracer 9$^a$ effects its control as it passes around the outside of a template are illustrated in a greatly exaggerated manner in Figs. 2 and 3 of the drawings. These steps are shown in this exaggerated form so that the operation of the mechanism may be more easily described. Commencing at CC on Fig. 2, the steps of movement comprise a downward movement and a movement to the right until the movement to the right is tangent to the curve of the template at VV, thereafter the steps of movement are made up of an up movement and a movement to the right. From the point CC to the point ZZ the movement to the right in the individual steps is a longer movement than the up or down movement and this movement to the right is made the leading movement while the down and up movements are respectively the away and toward movements. The extent of these movements is controlled by the tracer engaging and disengaging the template and when at point ZZ the up movement becomes longer than the movement to the right the cam, presently to be more fully described, is operated and the longer up movement, by the operation of the cam controlled relay, becomes the leading movement. During this period of operation the movements to the right constitute the leading movement until point ZZ is reached. When point ZZ has been reached, another change-over occurs and the up movement becomes the leading movement. Movement to the right is then the away movement until the point of tangency at FF is reached, after which movement to the left becomes the toward movement until point AA is reached. At the point AA movement to the left becomes longer than the up movement and another change-over is made so that this movement to the left becomes the leading movement. Movement to the left is continued as the leading movement past the point of tangency at WW until the point BB is reached. The down movement then becomes the longer movement and is made the leading movement past the point of tangency HH and until the point CC is again reached, thus completing the entire periphery of the template.

When following the inside periphery of a template in an anti-clockwise direction as shown in Fig. 3, the leading movement of the tracer 9$^a$ from the point X' to the point C'—corresponding to the points X, C of Fig. 2—will be a downward movement as in Fig. 2, but the other movement will be an away movement instead of the toward movement of Fig. 2. When following an inner periphery therefore the away movement will be the controlling movement and when the change in the direction of the leading movement is made at C' it will be the away movement which will be operating.

The control is effected by any suitable means such as a three electrode tube (to be described in more detail later), the grid voltage of which is controlled for instance by a condenser which is charged under control of the toward and away movements of the tracer and discharged under control of the leading motion of the tracer so that when the toward movement of a tracer following the outer periphery of a template, as shown in Fig. 2, or the away motion of a tracer following an inside periphery of a template, as shown in Fig. 3, is greater than the leading motion of the tracer in the operation steps previously referred to, the plate circuit of the tube will operate and the aforesaid cam will be actuated.

The circuits by which this operation is effected under control of a three electrode tube will now be described.

Figure 4:
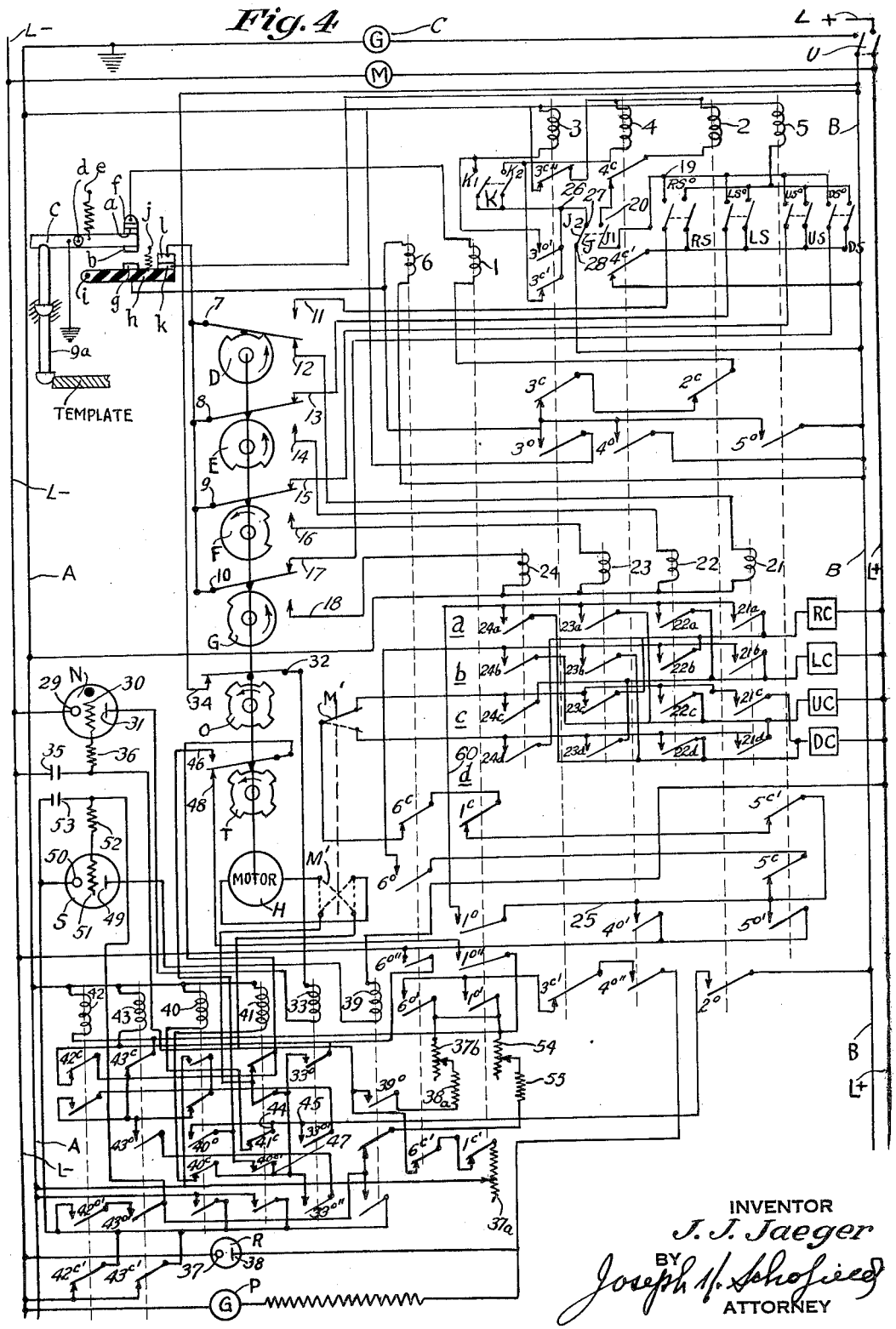
Fig. 4 is a diagram showing electrical circuits for effecting movements of the tracer continuously about a template.

Referring to Fig. 4 of the drawings, the tracer controlled contacts are diagrammatically illustrated to the left of this figure and comprise contacts $a$ and $b$ mounted in conducting relation to and on opposite sides of a lever $c$ which is normally held in an upper position by a spring $e$, with its contact $a$ in engagement with a stationary contact $f$ which will be the normal position of the lever when the tracer is not engaging the template. When the tracer $9^a$ engages the template the lever $c$ is oscillated about its pivot $d$ into a neutral position in which the contacts $a$ and $b$ will be respectively spaced from contacts $f$ and a lower contact $g$ mounted on a lever $h$ pivoted at $i$. The lever $h$ is normally maintained in its raised position by a spring $j$ with a contact $k$ on the outer end thereof in engagement with a stationary contact $l$. The contacts $g$ and $k$ are insulated from the lever $h$.

The stationary contact $f$ is connected to one line B of the two lines A, B between which there is maintained a constant direct current potential of about 12 volts by the direct current generator C. The line A is grounded. The contact $f$ is connected to the line B through the operating coil of relay 1, the normally closed contacts $2^c$ of the relay 2, the normally closed contacts $3^c$ of the relay 3 and through one or the other of the branch circuits of the normally open contacts $4^o$ or $5^o$ of relays 4 and 5 respectively.

The contact $g$ is connected to the line B through the operating coil of relay 6, and is adapted to be by-passed by a branch line containing the normally open contacts $3^o$ of relay 3 through which the operating coil of relay 6 is adapted to be grounded.

Contact $k$ on lever $h$ is connected directly with the line B, while the contact $l$ which is normally in engagement with the contact $k$ is connected to the four contacts 7, 8, 9, and 10 in parallel.

Contact 7 is connected to one or the other of the pair of contacts 11, 12 by a cam D; contact 8 is connected to one or other of the pair of contacts 13, 14, by a cam E; contact 9 is connected to one or other of the pair of contacts 15, 16, by a cam F; and contact 10 is connected to one or other of the pair of contacts 17, 18, by a cam G. The cams D, E, F and G are all mounted on a single shaft in fixed relative position and are adapted to be intermittently rotated in the manner hereinafter described by a motor H connectable across the lines A, B. The upper contacts 11, 13, 15 and 17 of the aforementioned pairs of contacts are respectively connectable to the contact 19 of an automatic-hand operation two-way switch J by hand operated switches RS, LS, US, and DS. The switch J has two conducting arms $J_1$ and $J_2$, the arm $J_1$ being adapted when in its lower position (for hand operation hereinafter referred to) to connect the contact 19 to contact 20 which is connected to line A through the normally closed contacts $4^c$ of relay 4, the actuating coil of relay 2 and another pair of normally closed contacts $3^{c'}$ of relay 3. For automatic operation of this machine the switch J will be in its upper position and the contacts 19, 20 will be open as shown in Fig. 4.

The lower contacts 12, 14, 16, 18 of the aforementioned pairs of cam operated contacts are respectively connected to line A through the operating coils of relays 21, 22, 23 and 24.

The operating coils of relays 21, 22, 23 and 24 respectively control the closing of four groups $a$, $b$, $c$ and $d$ of normally open relay contacts $21a$, $21b$, $21c$, $21d$; $22a$, $22b$, $22c$, $22d$; $23a$, $23b$, $23c$, $23d$; and $24a$, $24b$, $24c$, $24d$, respectively, illustrated in Fig. 4 of the drawings, and through such contacts in conjunction with the contacts of relays 1 and 6 they control the operation of the clutch magnets RC, LC, UC, and DC, by which the movement of the tracer respectively to the right, to the left, up, and down, is effected.

The clutch magnets RC, LC, UC, and DC are connectable between the lines L— and L+ to which a direct current voltage of, for instance, 115 v. is applied from a suitable source of supply.

The left side contacts of the relay contacts 21, 22, 23 and 24 of the first group of relay contacts are connected in parallel; a line 60 connects this group $a$ of contacts to the normally open contacts $1^g$ of relay 1 which are connected to line 25 which is connectable through further pairs of the normally open contacts $4^{o'}$ or $5^{o'}$ of relays 4 and 5, respectively, arranged in parallel, to line L—.

The operating coil of relay 4 is shown in Fig. 4 of the drawings. It is connected on one side, to the line A and connected on the other side, through the normally open contacts $K_2$ of a manually operated "away" switch K and another pair of normally closed contacts $3^{c'}$ of relay 3 arranged in parallel, to the point 26, which is connectable to the line B through the contacts 27, 28 of the switch arm $J_2$ of the two-way switch J previously referred to. These contacts 27 and 28 are closed when the switch J is in position for automatic operation as shown. The operating coil of relay 4 is thus in an operated condition when the machine is adapted for automatic operation, and consequently the normally open contacts $4^{o'}$ of such relay 4 in the circuit of the aforesaid relay contacts $21c$, $22c$, $23c$, and $24c$ will be closed.

The left side contacts of the relay contacts $21b$, $22b$, $23b$ and $24b$ of the second group $b$ of these relay contacts are connected together and in series with the normally open contacts $6^o$ of relay 6 which are connectable through the normally closed contacts $5c$ of relay 5 to line 25, and through the aforementioned contacts $4^{o'}$ and $5^{o'}$ of relays 4 and 5, arranged in parallel, to line L—.

The operating coil of relay 5 is shown in Fig. 4 and is connected on one side to the line A and on the other side to the line B through the normally open contacts $RS^o$, $LS^o$, $US^o$, $DS^o$, arranged in parallel, of the hand operated switches RS, LS, US, and DS, respectively and through another pair of normally closed contacts $4^{c'}$ of the previously mentioned relay 4. The operating coil of relay 5 will normally, therefore, be de-energized and consequently the normally closed contacts $5^c$ of such relay 5, in the circuit of said second group $b$ of relay contacts $21b$, $22b$, $23b$ and $24b$, will be closed, while the normally open contacts $5^{o'}$ of said relay 5 which are parallel to the contacts $4^{o'}$ of relay 4 between the lines 25 and L— will be open.

The left side contacts of the relay contacts $21c$, $22c$, $23c$ and $24c$ of the third group $c$ of relay contacts and the left side contacts of the relay contacts $21d$, $22d$, $23d$ and $24d$ of the fourth group $d$ of relay contacts are respectively alternatively connected in parallel through a portion of a triple pole, double throw directional switch M' to normally closed contacts $6^c$ of relay 6 which are connectable through the normally closed contacts $1^c$ of relay 1 and through the normally closed contacts $5^{c'}$ of relay 5, to line 25 which is connectable as aforesaid through the normally open contacts 4o' and 5o' of relays 4 and 5 arranged in parallel to line L—.

The left side of the magnetic clutch RC is connected to the right side contacts of following relay contacts, in parallel—relay contacts 21a of the first group a, relay contacts 22b of the second group b, relay contacts 23c of the third group c and relay contacts 24d of the fourth group d.

The left side of the magnetic clutch LC is connected to the right side contacts of the following relay contacts in parallel—relay contacts 22a of the first group a, relay contacts 21b of the second group b, relay contacts 24c of the third group c, and relay contacts 23d of the fourth group d.

The left side of the magnetic clutch UC is connected to the right side contacts of the following relay contacts in parallel—relay contacts 23a of the first group a, relay contacts 24b of the second group b, relay contacts 22c of the third group c and relay contacts 21d of the fourth group d.

The left side of the magnetic clutch DC is connected to the right side contacts of the following relay contacts in parallel—relay contacts 24a of the first group a, relay contacts 23b of the second group b, relay contacts 21c of the third group c, and relay contacts 22d of the fourth group d.

The three electrode tube N for controlling the operation of the operating motor H of the various cams, is shown in Fig. 4 of the drawings. The tube is gas filled and its cathode 29, which may be cold, or heated in any suitable manner, is connected directly to the line L—. This tube (for example an R. C. A. OA4G) is of the type which is adapted to be made conductive when the grid 30 thereof is raised to a critical voltage and which is adapted to remain conductive even though the applied voltage is removed from the grid. The plate 31 is connected to contact 32 through the operating coil of a relay 33. Contact 32 is connected to contact 34 and to line B under control of a cam O which is adapted to close said contacts at the zero, 90°, 180°, and 270° positions of the cam and to open said contacts between said positions. This cam O is operated by the cam operating motor H in unison with the other cams D, E, F, G and T.

The grid voltage of the tube N is controlled by a capacitor 35 which is connected in series with a resistance 36 across the cathode 29 and the grid 30 of the tube N. A charging voltage of, for instance, 150 volts is provided for the capacitor comprising the dynamotor generator P, one side of which is shown as connected to line L—. To insure a stable voltage for charging the capacitor 35 a voltage regulator tube R (which may be, for example, of the type OD 3/VR 150) is connected across the generator P, this tube having the necessary characteristics for levelling off any variations in the voltage generated by the dynamotor generator by varying its current such that the voltage between the cathode 37 and the plate 38 of the tube R will be substantially constant.

The other side of the dynamotor generator P is connected to the capacitor 35 through another pair of normally open contacts 4o'' of relay 4; a further pair of normally closed contacts 3c' of relay 3, another pair of normally open contacts 1o' and 6o' of relays 1 and 6 arranged in parallel, the rheostat 37b (for instance of 1 megohm), the resistance 38a (for instance of 50,000 ohms) and normally open contacts 39o of relay 39.

Connected across the terminals of the capacitor 35 in a discharging circuit for said capacitor are the rheostat 37a (for instance of 1 megohm) and another pair of normally closed contacts 1c' and 6c' of the relays 1 and 6 all arranged in series as shown.

Also connected across the terminals of the capacitor 35 forming a second discharging circuit therefor are normally open contacts 33o of relay 33.

The operating coil of relay 39 is controlled by a second three electrode tube S, the purpose of which will be described later. This operating coil is normally in operated condition during the operation of the machine and thus the contacts 39o of said relay 39 will be closed during such operation.

The operation of the cam operating motor H is controlled by the tube N through additional relays 40, 41, 42 and 43 and an additional cam T all shown in Fig. 4 of the drawings.

The operating coil of relay 40 is connected on one side to line A and on the other side to point 44 through the normally closed contacts 41c of relay 41. From point 44 there is a line extending to point 45 which is connected to line B through two branch lines one containing normally open contacts of relays 33 and 42, and the other containing the normally open contacts 2o of relay 2. Also from point 44 there is a line extending through normally open contacts 40o of relay 40 to the contact 46 which is connectable to line B by means of a cam T.

The operating coil of relay 41 is connected on one side to line A and on the other side to point 47 through the normally closed contacts 40c of relay 40. From point 47 there are two branch lines one extending to line B through normally open contacts 33o'' and 43o of relays 33 and 43, respectively, and the other extending to the cam operated contact 46 previously referred to through the normally closed contacts 41c' of relay 41.

The operating coil of relay 42 is connected on one side to line A and is connected on the other side through two branch circuits, one to line B through normally closed contacts 43c of relay 43, and the other through normally open contacts 1o'' of relay 1 to a contact 48 which is also connectable to line B by means of cam T.

The operating coil of relay 43 is connected on one side to line A and is connected on the other side through two branch circuits, one to line B through normally closed contacts 42c of relay 42, and the other through normally open contacts 6o'' of relay 6 to the aforesaid contact 48 which is connectable to line B by means of the cam T.

Cam T in its zero, 90°, 180°, and 270° positions connects contact 48 to line B while on its intermediate positions it connects contact 46 to line B.

The operation of the machine will now be described. The control switch U will first be closed by which their respective voltages are applied to lines A, B and lines L—, L+.

Presume that the tracer is engaging the template at the position X (Fig. 2) and that the machine is set for operating the tracer in a counter-clockwise direction by means of direction switch M' (which is manually operable and whose function will be explained below) when the tracer is to cooperate with the outer periphery of the template.

The switch J will be in its raised automatic position as shown in Fig. 4, disconnecting the contacts 19 and 20 in the circuit of the operating coil of relay 2 whereby said coil will be de-energized. The switch J in its automatic position shown will connect the contacts 27, 28 in the circuits of the operating coils of relays 3 and 4 but relay coil 3 will be de-energized since the contacts K1 and K2 controlled by the away switch K are open. Relay coil 4, however, will be energized since said contacts controlled by the away switch K are by-passed by the normally closed contacts 3c' of relay 3. Thus the normally closed contacts 2c and 3c of relays 2 and 3 in the circuit of the coil of relay 1 will be closed and the normally open contacts 4o of relay 4 in the circuit of said operating coil 1 will be closed.

The normally open contacts 3o of relay 3 in the branch circuit between relay coil 6 and line A will be open. Consequently the energizing of the coils of relays 1 and 6 will be controlled during the automatic operation of the machine by the contacts a and b on the tracer lever c.

Presume that the tracer is being pressed against the template such that the tracer lever c is in its neutral position in which the contacts a and b are spaced from their cooperating contacts $f$ and $g$ respectively. The operating coils of relays 1 and 6 will therefore be de-energized.

Presume that the cams D, E, F, G, T, and O are in their zero positions. Cam D will connect the operating coil of relay 21 across the lines A, B and consequently the normally open contacts 21a, 21b, 21c and 21d of relay 21 will be closed. The closing of the contacts 21c of relay 21 of the third group c of contacts will be the only relay contacts which close a circuit through one of the magnetic clutches, i. e. clutch DC, in the circuit of Fig. 4. The clutches RC and LC will not be energized since the normally open contacts 1° and 6° of the non-operated relays 1 and 6 are in the circuits of these clutches. The magnetic clutch DC, however, will be operated and the tracer will travel in a downward direction as shown in Fig. 3. The circuit of this clutch is from line L+, the magnetic clutch contacts 21c of relay 21 in the third group c of relay contacts, the direction switch M' as shown in full lines, the normally closed contacts 6$^c$ of relay 6, the normally closed contacts 1$^c$ of relay 1, the normally closed contacts 5$^{c\prime}$ of relay 5—this relay will be de-energized since all the hand switches RS, LS, US, and DS are open—and the normally open contacts 4$^{c\prime}$ of relay 4 which will be closed due to the energizing of the operating coil of relay 4 as previously described.

During this downward movement of the tracer which, due to the fact that it takes place when the lever c is in neutral position, will be the leading movement of the tracer, there will be a discharging of the capacitor 35 across the discharging circuit which includes the normally closed contacts 1$^{c\prime}$ and 6$^{c\prime}$ of relays 1 and 6 and the rheostat 37$^a$, and the charging circuit of the capacitor will be broken since the normally open contacts 1$^{o\prime}$ and 6$^{o\prime}$ in said circuit will both be open.

Downward movement of the tracer will release the pressure on the tracer and the tracer lever c will move to its upper position under control of spring e. Contacts $f$ and $a$ will close and the operating coil of relay 1 will be energized. This will open the contacts 16 of relay 1 in the circuit of the clutch magnet DC. The contacts of relay 39 which are parallel to the contacts of relay 1 will also be open since the operating coil of relay 39 is in the plate circuit of the tube S which normally conducts. The breaking of the circuit of the clutch magnet DC will cause the stoppage of the down movement of the tracer.

The operation of relay 1 will cause the closing of the contacts 10 of this relay in the circuit of the clutch magnet RC and since the relay contacts 21a and the relay contacts 4$^{o\prime}$ in their circuit of the clutch magnet RC are already closed this magnet will be energized and the tracer will be moved in a toward movement to the right as shown in Fig. 2. The relay contacts 1$^{o\prime}$ are also closed in the charging circuit of capacitor 35 and since the normally closed contacts 1$^{c\prime}$ of this relay 1 in the discharging circuit of the capacitor 35 are opened, the discharging of the capacitor 35 will cease and the charging of the capacitor will begin.

The charging of the capacitor will only take place for a limited time and for a shorter time than the discharging period since on the part of the curve adjacent point X the vertical component of the movement of the tracer is greater than the horizontal component of such movement.

Due to the movement of the tracer to the right the tracer will press against the template and the tracer contacts $a$, $f$ will be opened and the operating coil of relay 1 will be de-energized. The contacts 1° of relay 1 in the circuit of the clutch magnet RC will be opened and the horizontal movement of the tracer will be stopped. The contacts 1$^{o\prime}$ of relay 1 in the charging circuit of the capacitor 35 will also be opened and the charging of the capacitor will be stopped. The normally closed contacts 1$^{c\prime}$ of the discharging circuit of the capacitor will be closed and the discharging of the capacitor will be started again.

This step by step movement of the tracer with the alternate charging and discharging of the capacitor and the periodic changes from toward to leading movement will continue until the point CC is reached. At this point it will be seen that the horizontal component of movement of the tracer—that is, the toward movement—will be longer than the downward movement—that is, the leading movement for the time being—and consequently at this point the longer charging period of the capacitor 35 will raise the potential of the grid 30 to such a point that the tube N will become conducting and since at this time the cam O is in zero position closing the contacts 32, 34, the operating coil of relay 33 will be energized. This will result in the closing of the contacts of said relay in the branch discharging circuit of capacitor 35 resulting in the complete discharge of the capacitor. The tube N, however, will remain conductive and the coil of relay 33 will remain energized.

The contacts of the relay 33 will also be closed in the circuits of relays 40 and 41.

The movement of the tracer to the right resulting in the charging of the capacitor causing the tube N to conduct takes place during the toward movement of the tracer, that is, when the relay 1 is operating, consequently contacts 1$^{o\prime\prime}$ of this relay 1 in the branch circuit of the operating coil of relay 42 extending through the contacts closed by cam T in zero position will have closed the circuit for the coil of relay 42 and such coil will be energized. This will have resulted in the opening of the contacts 42$^c$ of this relay 42 in the circuit of relay 43 preventing the operation of this relay. It will also have resulted in closing the contacts of said relay 42 in the circuit of relay 40. The operating coil of said relay 40 will therefore be energized when the contacts of relay 33 are closed since the contacts 41$^c$ of relay 41 in this circuit are also closed.

The energizing of relay 40 results in the closing of the normally open contacts and the opening of the normally closed contacts of this relay 40 in the circuit of the cam operating motor H and the rotation of the motor in a direction to move the cams D, E, F, G, O and T in a counter-clockwise direction determined by the position of switch M'.

If the tracer had been following the internal periphery of the template as in Fig. 3 of the drawings, the movement of the tracer which caused the operation of the tube N would have been an away movement as previously indicated and during this movement the relay 6 would be energized. Thus when the tube N was operated and the coil of relay 33 energized, the contacts of relay 6 would have been closed instead of the contacts of relay 1. Thus the coil of relay 43 would have been energized and the coil of relay 42 de-energized by the normally closed contact 43$^c$ and the contacts of relay 43 would have been closed in the circuits of the operating coil of relay 41. Therefore upon the closing of the contacts of relay 33 in this circuit the operating coil of relay 41 would have been energized and the normally closed contacts and the normally open contacts of this relay 41 in the circuit of motor H would have been opened and closed respectively. Consequently with the direction switch M in the same position as formerly, the motor H would operate to rotate the cams in a clockwise direction. The switch M' therefore must be changed if the tracer is to be moved in an anti-clockwise direction. The machine would operate, however, if the tracer were moved in a clockwise direction.

The rotation of cam T will break the branch circuit of the operating coil of relay 42 but this will remain energized since the circuit through the normally closed contacts of relay 43 is closed. Cam T will also temporarily close a holding circuit for the coil of relay 40 through the contacts of this relay.

The rotation of cam O will first open and then close the plate circuit of tube N which will become non-conducting and will not become conducting again until the capacitor 35 is again charged sufficiently to raise the grid voltage of the tube to the critical value. The operating coil of the relay 33 will be de-energized and the contacts of the relay 33 will be opened in the circuit of the operating coil of relay 40 but this coil will remain energized due to the holding circuit established by cam T.

The rotation of cam D will result in the de-energizing of the coil of relay 21 and the consequential opening of the contacts 21a, 21b, 21c and 21d of this relay 21 in the four groups of relay contacts of Fig. 4.

The rotation of cam F to the 90° position will result in the closing of the circuit for the operating coil of the relay 23 resulting in the closing of the normally open contacts 23a, 23b, 23c and 23d of this relay 23 in the four groups of relay contacts of Fig. 4.

When the cam T reaches the 90° position the holding circuit of the operating coil of relay 40 will be broken and the operating coil of said relay 40 will be de-energized resulting in the reopening of the normally open contacts and the reclosing of the normally closed contacts of the relay 40 in the circuit of the cam operating motor H and the consequential stopping of this motor.

The clutch magnet RC will be energized through the circuit including the closed contacts 23c of the third group c of relay contacts, the direction switch M', the normally closed contacts 6c, 1c and 5c' of relays 6, 1 and 5, all of which are closed since the tracer is in its neutral position, and the normally open contacts 4o' of relay 4 which are now closed as aforesaid. The tracer will therefore move to the right and this movement, since it takes place while the tracer lever c is in neutral position, will now be the leading movement. The discharging of the capacitor 35 will continue while the movement to the right continues. This movement to the right increases the pressure of the tracer against the template, resulting in the swinging of the tracer lever c and the closing of the contacts b, g, whereupon the coil of relay 6 is energized. Due to the energizing of the coil of relay 6, the normally open contacts and the normally closed contacts of this relay 6 will be respectively closed and opened. Consequently the circuit to the clutch magnet RC will be broken, the discharging circuit of the capacitor 35 will be broken, the charging circuit of the capacitor 35 will be closed and a circuit will be closed through the closed contacts 23b of relay 23 in the second group b of relay contacts with the clutch magnet DC. The tracer will consequently be moved downwardly and during such movement charging of the capacitor 35 will take place.

Release of pressure on the tracer will result from the downward movement of the tracer and the tracer lever c will move to neutral position resulting in the opening of the circuit containing the coil of relay 6, the stopping of the downward movement of the tracer, the change-over to the horizontal leading movement of the tracer, the breaking of the charging circuit of the capacitor 35 and the closing of the discharging circuit of the capacitor 35. The step by step movement of the tracer will continue with new periodic downward away movements and leading movements to the right until the movement to the right is tangent to the outer periphery of the template. When this occurs the tracer lever c will not be rocked a further extent by additional pressure on the tracer but the entire pressure will be released and contacts a and f will close resulting in the energizing of the operating coil of relay 1 and the consequential closing and opening respectively of the normally open and normally closed contacts of such relay 1. This will result in the closing of the clutch magnet UC causing upward movement of the tracer, the closing of the charging circuit of the capacitor 35 and the opening of the discharge circuit of said capacitor 35. This leading movement, however, is not changed. This will take over again when the tracer contacts the template moving the lever c to neutral position in which the leading horizontal movement to the right of the tracer will take place consequent upon contacts a, f and b, g being open.

A step by step movement of the tracer will continue made up of the upward toward movements during which the capacitor 35 will be charging and the leading movements to the right during which the capacitor will be discharging. The periods during which discharging takes place will gradually decrease while the periods during which charging takes place will gradually increase until when the tracer reaches the point where the length of the upward charging movement exceeds the length of the leading movement to the right, the capacitor will be charged to its critical voltage and the grid voltage of the tube N which will correspond to the capacitor voltage, will cause the tube N to conduct again.

This will result in the energizing of the coil of relay 33, the closing of the contacts of such relay 33 in the circuits of the coils of relays 40, 41, the energizing of the coil of relay 42 through contacts of relay 1 and the cam T, the energizing of the coil of relay 40, the closing of the circuit of the cam operating motor H and the further rotation of the cams D, E, F, G, O and T a quarter of a revolution resulting in the breaking of the circuit of the coil of relay 23 by cam F, the closing of a holding circuit for the coil of relay 40 by cam T, the breaking of the plate circuit of the tube N by the cam D and the consequential de-energizing of the coil of relay 33, the closing of a circuit for the operating coil of relay 22 by the cam E, the breaking of the holding circuit of the coil of relay 40 by the movement of the cam T to the 180° position and the stopping of the cam driving motor with the cams at the 180° position all as previously described.

The energizing of the coil of relay 22 will close the normally open contacts of 22a, 22b, 22c and 22d of the relay 22 in the four groups a, b, c and d of relay contacts of Fig. 4.

The clutch magnet UC will be energized through the contacts 22c of relay 22 in the third group of relay contacts, this being the new leading motion since the lever c is in its neutral position. Up motion of the template will take place pressing the tracer harder against the template and resulting in the closing of contacts b, g and the energizing of the coil of relay 6. Thereupon the closed contacts 22b of relay 22 in the second group b of contacts connected to the now closed contacts of relay 6 will close the circuit through clutch magnet RC. The tracer will be moved to the right by this clutch magnet until the tracer lever c moves to neutral position due to the relief of pressure thereon whereupon the clutch magnet UC will take over. The tracer will therefore be moved around the template from the point ZZ by step by step movements made up of movements to the right and up leading movements during the former of which the capacitor 35 will be charged and during the latter of which the capacitor will be discharged in the manner previously described. When the up movement is tangent to the template periphery at FF pressure on the tracer will cease and the tracer contacts a, f will close resulting in the energizing of the coil of relay 1 whereupon the clutch magnet LC will take over for the clutch magnet RC and the movement of the tracer 9a will continue in steps made up of toward movements to the left and the up leading movement which will not have changed, the capacitor being charged during the movement to the left and discharged during the leading up movement. When the point AA is reached the charging toward movement to the left will be longer than the discharging up leading movement and the grid voltage of tube N will reach its critical point causing the tube N again to conduct. This, as previously described, will result in the operation of the cam driving motor H and the rotation of the cams a further quarter revolution, this time to the 270° position in which position cam G will close the circuit of the operating coil of relay 24.

The normally open contacts 24c of relay 24 close the circuit through the clutch magnet LC and the tracer will be moved to the left which will become the leading movement of the tracer since this is the movement which results from the tracer lever c being in neutral position. Movement to the left will press the tracer harder against the template resulting in the tracer lever c being moved into the position in which contacts b and g are closed. This results in coil of relay 6 being energized and the closing and opening respectively of the normally open and normally closed contacts thereof. The closing of the normally open contacts 6° of relay 6 will close a circuit through the normally open contacts 24b of relay 24 in the second group b of contacts and the clutch magnet UC. Up movement of the tracer 9ª will follow and the tracer will be moved counter-clockwise around the template from point AA in a series of steps made up of up movements and leading movements to the left during the former of which the capacitor 35 will be charged and during the latter of which the capacitor will be discharged. When the tracer reaches the position on the template in which the leading movement to the left is tangent to the periphery of the template the relay 1 will take charge in place of the relay 6 as previously described and a down movement substituted for the up movement, the leading movement to the left not being changed. The circuit for the clutch magnet DC for effecting the down movement will be through the normally open contacts 1° of relay 1 which are now closed and the normally open contacts 24a of the relay 24 in the first group a of relay contacts.

The tracer will now move in a series of steps made up of down toward movements and leading movements to the left during the former of which the capacitor 35 will be charged and during the latter of which the capacitor 35 will be discharged. When the point BB is reached the grid of tube N will reach critical voltage since at this point the down, charging movement is longer than the left discharging movement. The tube will therefore conduct and the coil of relay 33 will be energized resulting in the manner previously described, in the cam driving motor H being operated to move the cams through another 90° of movement, this time into the 360° position which is the equivalent of the zero position.

When this position is reached the coil of relay 21 will again be operated and the tracer will be moved in a series of steps to the position X first in a series of steps made up of left movements, and down leading movements until the tangent position of the down leading movement is reached at HH and then in a series of steps made up of toward movements to the right and down leading movements. Charging and discharging of the capacitor during the right toward movement and the down leading movement respectively will take place and will continue from the point x to the point CC as previously described.

It will be realized that during the operation of the machine that as the length of the leading motion of the steps of progression of the tracer gradually decrease that the capacitor will not fully discharge and there will be left an accumulated charge on the capacitor at the beginning of the movement during which charging takes place. This charge will progressively increase until it reaches the critical value substantially at the points CC, ZZ, AA and BB. This will be effected by the use of the correct parameters for the charging and discharging circuits.

The operation of the tracer by means of the clutch magnets to correspondingly move the cutter is effected through means of a nut and screw as fully described in the above referred to patent to Shaw. It will be appreciated therefore that, when there is a change from one direction to the reverse direction, a certain amount of back lash between the nut and the screw has to be taken up. The clutch magnet which is operated to make the reverse movement will be operated not only during the time necessary to actually move the tracer in the reverse direction but also the time necessary to rotate the screw to take up said back lash. Such reverse movement takes place at the points where the leading motion is tangent to the periphery of the template and thus since the change in movement is effected during a toward movement of the tracer as distinct from a leading movement it is possible that during the extra time that the magnet effecting such movement is energized, the capacitor 35 which is being charged during such period could be charged to the critical voltage causing an incorrect operation of the machine. To avoid this, said second three electrode tube S is provided.

The plate 49 of tube S is connected to line L+ through the operating coil of relay 39. The cathode 50 of the tube is connected to the line L— through normally closed contacts 42c' and 43c' of relays 42 and 43 and normally open contacts 40o' and 41o of relays 40 and 41 all in parallel. Connected across the grid 51 and the cathode 50 are the resistance 52 of, for instance, 25,000 ohms and the condenser 53 of, for instance, 1 m.f. Charging of the condenser is effected from the generator P, previously referred to, through a circuit including the normally open contacts 1°' and 6°' of relays 1 and 6 arranged in parallel, rheostat 54, for instance, of 1 megohm, resistance 55 of, for instance, 50,000 ohms and normally closed contacts 39c' of the aforesaid relay 39. Two discharging circuits are provided for the capacitor 53, namely, the circuit including the normally open contacts of relays 42, 43 and the circuit including the normally open contacts of the relay 39.

Normally during the operation of the machine the tube S is conducting and the coil of relay 39 is energized, the plate circuit being completed through one or other of the contacts of relays 42 and 43. This results in the normally open contacts of the relay 39 in the charging circuit of the capacitor 35 of tube N being closed; the normally closed contacts of the relay 39 in the charging circuit of capacitor 53 being open and the normally open contacts in the discharging circuit of the capacitor 53 being closed. Consequently there will normally be no charging of the capacitor 53 and the capacitor will be completely discharged.

Presume that the tracer is moving along the lower tangent to the template between the points CC and ZZ. The down movement has taken place consequent upon the energizing of the coil of relay 6 and the coil of relay 43 has been energized and remains energized after the opening of the contacts of relay 6 since it is connected to line B through the normally closed contacts of relay 42.

The tracer lever c has moved to neutral position to permit the leading right movement to become active. Tracer lever c then closes contacts a, f energizing the coil of relay 1 and causing the up movement of the tracer. The closing of the normally open contacts of relay 1 in the branch circuit of coil of relay 42 through the contacts of cam T will energize coil 42 and will open the normally closed contacts of the relay 42 in the plate circuit of tube S. The operation of relay 42 will de-energize the coil of relay 43 by opening the normally closed contacts of relay 42 in the circuit of said coil of relay 43 but there will be a slight lag in the de-energizing of said coil of relay 43 and during this lag the normally closed contacts of relays 42 and 43 in the plate circuit of tube S will both be open and said plate circuit will be broken and the coil of relay 39 de-energized. This will result in the opening of the contacts of the relay 39 in the charging circuit of the capacitor 35 of tube N preventing the charging of said capacitor.

The plate circuit of the tube S is again completed by the closing of the contacts of relay 43 but the tube S will not conduct until the capacitor 53 thereof has been charged to a critical voltage. Upon the de-energizing of the coil of relay 39, the normally closed contacts of the relay 39 in the charging circuit of the capacitor 53 were closed and since the normally open contacts of relay 1 in this circuit are also closed at this time, charging of the capacitor 53 takes place—the normally open contacts of relay 39 in the discharging circuit being open. By the proper selection of parameters, the time at which the voltage across the condenser 53 reaches its critical value to cause tube S to again become conductive can be made longer than the time necessary for the back lash to be picked up and upon this time expiring, operation of the machine again becomes normal. When tube S again becomes conductive due to the condenser 53 reaching the critical voltage of tube S, the coil of relay 39 is again energized, thus completing the charging circuit of the capacitor 35 of tube N, and completing the discharge circuit of the capacitor 53 of tube S.

If the tracer 9ª is to follow the inner periphery of a template in the counter-clockwise direction, switch M' is closed for operating the motor H in the clockwise direction when contacts of relay 40 are closed and for connecting the fourth group $d$ of relay contacts 21$d$, 22$d$, 23$d$, 24$d$ in circuit with the normally closed contacts 1ᶜ and 6ᶜ of relays 1 and 6. By this arrangement, when the tracer lever $c$ is in neutral position the sequential closing of contacts 21$d$ and 22$d$ of relays 21 and 22 instead of energizing the clutch magnets DC and UC in this sequence will operate the clutch magnets UC and DC in this reverse sequence respectively and the closing of the contacts 23$d$ and 24$d$ of relays 23 and 24 instead of energizing the clutch magnets RC and LC will energize the clutch magnets LC and RC respectively, in this reverse sequence and the tracer will follow a clockwise direction about the template.

Circuits have been provided for enabling the tracer to be brought into contact with the template and to start its operation around the template in the right direction. Circuits have also been provided for withdrawing the tracer from the template at the conclusion of its operation. These circuits include four push button switches RS, LS, US, and DS corresponding respectively to the right, the left, up and down motions of the tracer with reference to Fig. 2 of the drawings. These circuits also include hand-automatic switch J (Fig. 4) which must be moved to "hand" position, that is to the left, disconnecting J₂ and connecting J₁, to make the push button switches effective. When moved to the "hand" position, switch J₂ opens the contacts 27, 28 in the circuit of the operating coils of relays 3 and 4 and closes contacts 20, 19 in the circuit of the operating coil of relay 2.

Assume that the tracer is below the template and not in contact therewith. The coil of relay 1 will be energized and its normally open contacts and its normally closed contacts will be closed and opened respectively, since the tracer contacts $a$, $f$ will be closed. The operating coils of relays 3 and 4 will be de-energized since their operating circuits are broken by the switch J.

To initiate up movement of the tracer, the push button switch US is operated resulting in the closing of a circuit of the coil of the relay 5 through said switch US and through the normally closed contacts of relay 4.

In the circuit of the first group $a$ of relay contacts 21$a$, 22$a$, 23$a$ and 24$a$ (Fig. 4) the normally open contacts 5ᵒ' of relay 5 will be closed bridging the contacts 4ᵒ' of relay 4 which will be open due to the fact that the coil of relay 4 was de-energized by switch J. The left hand relay contacts 21$a$, 22$a$, 23$a$ and 24$a$ of the first group $a$ of relay contacts, arranged in parallel, will therefore be connected to line L— through the closed contacts 1ᵒ and the closed contacts 5ᵒ'.

The energizing of the coil of relay 5 will also open the normally closed contacts 5ᶜ' of this relay 5 in the circuits of the third and fourth groups $c$ and $d$ of relay contacts 21$c$, 22$c$, 23$c$, 24$c$, 21$d$, 22$d$, 23$d$ and 24$d$.

The pressing of the up button switch US also closes the contacts of this switch the right-hand contact of which is connected to contact 15 of the cam operated switch F. The left-hand contact of such switch is connected through the closed contacts 19, 20 of switch J, the normally closed contacts 4ᶜ and 3ᶜ of relays 4 and 3 (which are now closed), the operating coil of relay 2 to the line A. If the cam operated switch F is in any position but the 90° position, the coil of relay 2 will be energized and said relay will open the normally closed contacts 2ᶜ of the relay 2 in the circuit of the operating coil of relay 1 causing said coil to be de-energized and opening the contacts 1ᵒ of such relay 1 in the circuit of thte first group $a$ of relay contacts 21$a$, 22$a$, 23$a$, 24$a$ aforesaid. The operation of relay 2, however, will also close the normally open contacts 2ᵒ in the branch circuit of the coil of relay 40, energizing said relay, and through such relay causing the operation of the cam operating motor H. The motor will rotate the various cams, including cam F, until the circuit of the operating coil of relay 2 is broken at contact 15—that is, to the 90° position.

On the de-energizing of the coil of relay 2, the coil of relay 1 will again be energized and the circuit of the first group $a$ of relay contacts 21$a$, 22$a$, 23$a$, 24$a$ will be ready for completion by the closing of one of said contacts. In the 90° position of the cams, cam F will close a circuit of the coil of relay 23 and the contacts 23$a$ of this relay 23 will be closed resulting in the energizing of the clutch magnet UC connected to relay contact 23$a$ in the first group $a$ of relay contacts. The tracer will therefore move upwardly until it engages the template when further upward movement will be stopped by the opening of the contacts of relay 1.

In like manner the tracer could be moved in any required direction towards the template by pressing the corresponding push button switch.

When the tracer is in contact with the template automatic operation of the machine may be commenced by moving the switch J to automatic position as shown in Fig. 4 of the drawings.

When an operation of the machine has been completed and it is desired to move the tracer away from the template the "away" switch K is momentarily manually operated. Assume that when such switch is operated the switch J is in automatic position as shown in Fig. 4 of the drawings. The operating coil of relay 3 will be energized and this relay will lock itself in by closing the normally open contacts of the relay 3 across the switch K. The operation of relay 3 will open the normally closed contacts of such relay 3 in the circuit of the operating coil of relay 1, thus preventing any "toward" movement of the tracer. Said relay 3, however, will close the normally open contacts thereof connecting the operating coil of relay 6 to line A thereby energizing such coil and causing operation of the machine in the "away" direction, the actual direction of movement depending upon which of the relay contacts of the second group $b$ of relay contacts 21$b$, 22$b$, 23$b$, 24$b$ are closed. Release of the away contact switch K₂ will release relay 4 stopping all motions of the machine by opening the contact of relay 4 in the main line circuit to the clutch magnet. Relay 3, however, will remain operated through the holding contacts 3ᵒ' of relay 3 in parallel with the away switch contacts K. This prevents any other operation of the machine until the relay 3 is released by placing the switch J in the hand operating position and opening the contacts J₂.

The contacts $k$, $l$ controlled by the tracer arm $h$ are safety contacts. These contacts remain closed during the normal operation of the machine but if when the tracer is pressed against the template so as to engage contacts $b$, $g$ which will ordinarily cause an "away" movement and the "away" movement does not result for any reason, further pressure on the tracer 9ª will cause arm $h$ to rock about its pivot $i$, to open the contacts $k$, $l$ and the opening of these contacts will stop the machine by breaking the circuits of all of the coils of relays 21, 22, 23 and 24.

It will be appreciated that other means controlled by the differences in the length of time taken by the leading movement and by the toward or away movement can be readily devised acting in substantially the same manner and accomplishing the same result as that described in this specification.

What I claim is:

1. A control arrangement for a profiling machine adapted to cooperate with electrical circuits of a tracer contacting the periphery of a template, including electrical automatically operable controller means controlling the movement of the tracer in first directions, at one time towards, and at other times away from the template, and in a second direction at an angle to said first directions, said directions being interchangeable with respect to up, down, right, and left movements in accordance with the relative position of the tracer on the template; a plurality of circuits selectively energizing said controller means for effecting movement of the tracer in predetermined directions with respect to the template and in predetermined sequence; switching means interconnecting said circuits; an electric comparison circuit connected to said circuits, said electric comparison circuit including an amplifying means, a storage means and a discharging means for said storage means, comparing the relative lengths of movement of the tracer in the first directions and in the second direction by the relative length of the charging and discharging time of said storage means; and circuit elements operable on the switching means and controlled by said comparison circuit to automatically change the sequence and direction of movement of the tracer with respect to the template, in a predetermined pattern.

2. In a profiling machine in combination, a tracer adapted to move about the periphery of a template and engage the same, circuits controlling movement of said tracer in first directions, at one period toward, and at another period away from the template, and a second direction at an angle to said first directions, said circuits being controlled by engagement and disengagement of said tracer with said template and including circuit switching cams, a motor for acuating said cams and a circuit energizing said motor to advance said cams, an electric comparison circuit connected to said control circuits, said electric comparison circuit including an electron tube, a condenser associated with such tube to control its grid voltage and a discharging circuit, said condenser and discharging circuit comparing the relative length of movement of said tracer in the first directions with that in the second direction by the relative length of the charging and discharging time of said condenser, and circuit elements operable on said motor energizing circuit under control of said comparison circuit so that said cams are advanced in accordance with the conditions in said comparison circuit to switching positions to interchange the toward and away movements in the first directions with the second direction in accordance with the position of the template at any point on the periphery of the template where the lengths of movement of the tracer in the first directions and the second direction become equal.

3. In a profiling machine in combination, a tracer, adapted to move about and contact the periphery of a template, tracer moving means operatively associated with said tracer for moving the same by movements, at one time in a toward and at another time in a from direction with respect to said template and a leading movement in a direction at an angle thereto, said movements being interchangeable with respect to up, down, right, and left movements of the tracer with respect to the template and in accordance with the position of the tracer on the template, circuits controlling said tracer moving means, said circuits including rotatable cams, actuating switches disposed thereon, a motor to operate said cams, and a circuit to said motor operating the same, an electric comparison circuit connected to said control circuits, said electric comparison circuit including an electron tube, a condenser associated with such tube to control its grid voltage and a discharging circuit, said condenser and discharging circuit comparing the relative length of movement of said tracer in the first directions with that in the second direction by the relative length of the charging and discharging time of said condenser, and circuit elements operable on said motor operating circuit under control of said comparison circuit so that said cams are advanced in accordance with the conditions in said comparison circuit to switch positions in which the direction of the leading movement with respect to the template is changed when the relative lengths respectively of the toward and away and the leading movements reach a predetermined ratio, whereby at certain points on the periphery of the template changes in the directions of the leading movement and of the movement toward and from the template may be made so that the tracer may automatically traverse the entire periphery of the template.

References Cited in the file of this patent

UNITED STATES PATENTS

| 1,683,581 | Shaw | Sept. 4, 1928 |
| 2,331,337 | Meyer | Oct. 12, 1943 |
| 2,332,533 | Roehm | Oct. 26, 1943 |
| 2,334,956 | Ridgway | Nov. 23, 1943 |
| 2,345,218 | Rosen | Mar. 28, 1944 |
| 2,389,594 | Caldwell | Nov. 27, 1945 |
| 2,390,566 | Turchan | Dec. 11, 1945 |
| 2,433,564 | Keller et al. | Dec. 30, 1947 |
| 2,484,968 | Sponaugle | Oct. 18, 1949 |

FOREIGN PATENTS

| 459,685 | Great Britain | Jan. 13, 1937 |
| 524,875 | Great Britain | Aug. 16, 1940 |